Sept. 3, 1963 C. D. WERWIN ET AL 3,102,635

CONTAINER FOR DISC RECORDS AND THE LIKE

Filed April 8, 1960

INVENTORS
CHARLES D. WERWIN
LOUIS SUKOFF
BY
Brumbaugh, Free, Graves & Donohue
THEIR ATTORNEYS 3,102,635
Patented Sept. 3, 1963

3,102,635

CONTAINER FOR DISC RECORDS AND THE LIKE

Charles D. Werwin, Bridgeport, Conn., and Louis Sukoff, Jamaica, N.Y., assignors to Columbia Broadcasting System, Inc., New York, N.Y., a corporation of New York Filed Apr. 8, 1960, Ser. No. 20,974
2 Claims. (Cl. 206—62)

The present invention relates to containers, and more particularly, to a container for disc records and the like.

It has been the prior practice to provide a container for disc records of one kind or another to protect the delicate surfaces thereof from damage and from the accumulation of foreign matter, all of which interferes with the fidelity of reproduction of the program material recorded thereon.

The present invention provides a novel container for one or more disc records which is both protective and convenient to manipulate for reading the label thereof or for removing the record without touching the delicate surfaces on which the program material is recorded.

In a preferred embodiment of the container of the present invention, an outer cover is provided for an inner disc record holder, both of which protect the disc record from damage. The inner holder is pivotally connected to the outer cover so that the disc record can be transported from the exterior to the interior of the cover, or vice versa, by relative movement between the cover and the record holder. Located intermediate the record holder and the outer cover and disposed in an opening in the record holder is means for moving a disc record with respect to the record holder as the record holder is moved relative to the outer cover. By means of this arrangement, a disc record carried by the record holder is partially ejected from the record holder when the record holder is extended beyond the cover. Thus, the disc record can either be viewed or handled conveniently for reading the label or for removal therefrom. Conversely, when the record holder is moved into the outer cover, the protruding disc record falls into place in the record holder.

The invention may be better understood from the following detailed description of a representative embodiment when taken in conjunction with the following drawing, wherein.

Figure 1:
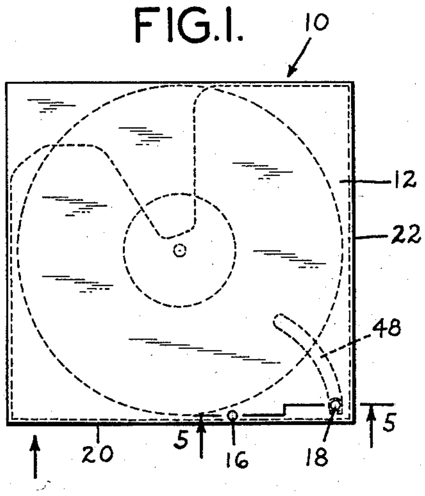
FIG. 1 is a view in front elevation of a container for disc-type records, constructed according to the invention.
Figure 3:
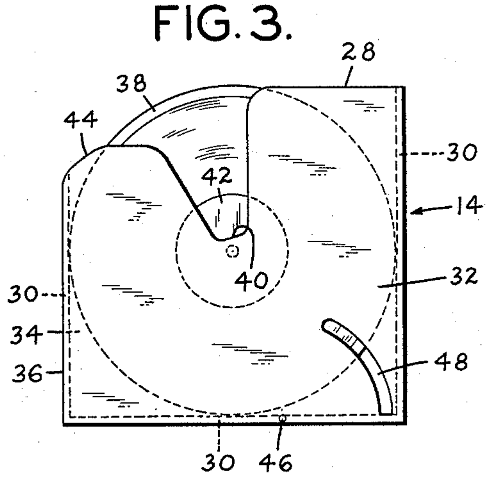
FIG. 3 is a view in front elevation of the inner record holder.

While the container of the invention may be designed to hold more than one disc record, for the sake of simplicity it will be illustrated herein in its simplest form in which provision is made for only a single disc record.

As shown in FIGS. 1 through 4, the disc record container 10 includes an outer cover 12 and an inner record holder 14 pivotally connected thereto by suitable means such as rivets 16 and 18. The outer cover 12 is fabricated from a rigid material such as cardboard and has two adjacent open sides 20 and 22. Openings 24 and 26 are provided in one corner of the cover 12 displaced slightly from the open sides. The interior of the cover is made wide enough to comfortably receive the inner holder 14 therein.

The inner holder 14 is also fabricated from a rigid material, such as cardboard, but it can be of lesser thickness than the outer cover 12, and its dimensions are advantageously made slightly smaller than those of the outer cover so as to enable the inner holder 14 to be inserted therein. The inner holder 14 has one open side 28 through which a disc record may be inserted. It may comprise opposite sides 32 and 34 of cardboard secured to and spaced apart by thin strips 30 of rigid material such as wood between them at the side and bottom edges of the inner holder 14. The inner holder is preferably made wide enough to accept a disc record 38 comfortably and the height thereof is preferably such that a portion of the disc record to be contained therein protrudes slightly above the open side 28. The open side 28 is formed with a generally V-shaped opening 40 enabling the label 42 of the disc record carried in the inner holder to be viewed readily, and an arcuate edge 44 is provided so that the inner holder 14 can be rotated to bring the opening 40 therein completely out of the cover.

An opening 46 is provided in the inner holder 14 that can be aligned with the openings 24 in the outer cover to enable the inner holder to be inserted in the outer cover and to be pivotally secured thereto as described in greater detail below. An arcuate slot 48 is formed in the holder 14 to the right of the opening 46 therein, its center being located at the opening 46. In assembly, the inner holder 14 is inserted in the cover 12 so that the holes 24 and 46 are in registry and the hole 26 is in the lower end of the slot 48. The holder 14 is then pivotally secured in the cover 10 by means such as a rivet 16 extending through the holes 24 and 46. A peg 50 (FIG. 5) of a rigid material, such as plastic or wood, is then inserted in the arcuate slot 48 and is fixed in place therein and to the opposing surfaces of the outer cover 12 by suitable means such as rivets 18 extending through the openings 26 in the outer cover 12.

The length of the arcuate opening 48 is adjusted to enable the inner holder 14 to be rotated about the pivot provided by the rivet 16 to bring the opening 40 in the inner holder 14 completely out of the cover 10. At this point the peg 50 and the upper edge of the slot 48 cooperate to serve as a stop preventing further outward movement of the inner holder 14.

In operation, assuming that a record 38 is in the closed container as shown in FIG. 1, the inner holder 14 is rotated beyond the outer cover 10 by applying slight pressure to the left side of the inner holder until a portion thereof extends beyond the outer cover. For example, the container can be held in the right hand and a finger of the left hand can be inserted in the side 20 of the outer cover (as at the point marked with the arrow in FIG. 1) to exert pressure on the inner holder. The inner holder 14 can then be moved to its extended position by moving the outer cover and the inner holder in opposite directions with respect to each other.

Figures 2, 4, 5:
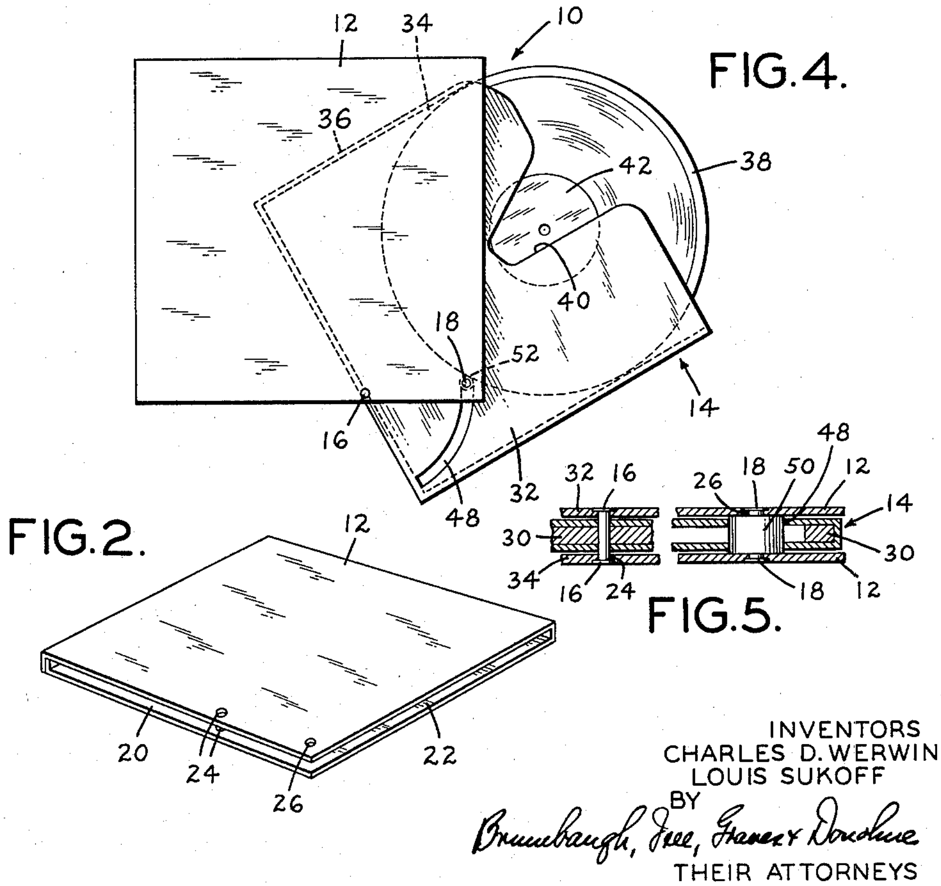
FIG. 2 is a perspective view of the outer cover.
FIG. 4 is a view in front elevation of the inner record holder extended beyond the outer cover.
FIG. 5 is a view in section taken along the line 5—5 in FIG. 1, looking in the direction of the arrows.

As shown best in FIG. 4, during the rotational movement of the inner holder, and before the upper extremity of the arcuate opening 48 engages the peg 50, the peg 50 contacts the lower edge 52 of the disc record 38 and exerts an upward thrust on the record, which forces towards it the edge 36 of the inner holder. As the thrust is continued the disc record rolls clockwise so that when the peg 50 reaches the upper extremity of the arcuate opening 48, the disc record is partially ejected out of the outer cover.

In this position, the label can be read conveniently or the disc record can be rotated slightly about the peg on which it rests to facilitate reading the label. Additionally, since the disc record is in a raised position while it rests on the peg 50, it can be removed from the inner holder without touching the grooved surface thereof with the hands. For example, the record can be grasped between the label and an edge with the thumb and middle finger and slidably removed from the inner holder.

To replace the inner holder 14 with or without a disc record therein, the inner holder is merely pushed back into the outer cover 10.

While the disc record container shown in FIGS. 1–4, inclusive, is adapted to receive only one record, it will be understood that the container may readily be adapted for a plurality of records. This might be accomplished, for example, by mounting a plurality of inner holders pivotally within a single outer cover, the latter being made sufficiently wide for this purpose. Also, the container may be used for objects other than disc records. Moreover, the material for the outer cover and the inner holder may be other than cardboard. Additionally, a plurality of disc record containers can be advantageously mounted together on a surface along the closed sides thereof in any convenient position for forming disc record rack. Other modifications that can be made within the spirit of the invention will be apparent to those skilled in the art.

The specific embodiment described above is obviously susceptible of modification within the spirit of the invention. Accordingly, the scope of the invention is not to be limited thereto but is to be determined by the appended claims.

We claim:

1. A container comprising a cover, a holder pivotally connected to said cover for movement into and out of said cover and having an opening to its interior exposed when the holder is moved out of said cover and through which a body to be stored may be inserted therein and removed therefrom, and means connected to said cover and said holder for moving said body outwardly with respect to said holder during the pivotal movement of said holder, said means including an arcuate slot in said holder whose center of curvature is at said pivotal connection and a follower connected to said cover and running in said slot.

2. A container comprising a cover, a holder pivotally connected to said cover for movement into and out of said cover and having an opening to its interior exposed when the holder is moved out of said cover and through which a body to be stored may be inserted in and removed from said interior, cam means formed on said holder, and cam-follower means formed on said cover and operatively associated with said cam means, said cam-follower means engaging said body and moving said body outwardly with respect to said holder during pivotal movement of said holder.

References Cited in the file of this patent

UNITED STATES PATENTS

| | | |
|---|---|---|
| 895,655 | Mitchell | Aug. 11, 1908 |
| 1,048,285 | Brand | Dec. 24, 1912 |
| 1,153,963 | Sengstock | Sept. 21, 1915 |
| 2,574,050 | McCart | Nov. 6, 1951 |
| 2,720,204 | Wallach | Oct. 11, 1955 |
| 2,902,327 | Larsen | Sept. 1, 1959 |

FOREIGN PATENTS

| | | |
|---|---|---|
| 458,933 | Great Britain | Dec. 30, 1936 |
| 592,683 | Great Britain | Sept. 25, 1947 |